US010246359B2

(12) United States Patent
Lang

(10) Patent No.: US 10,246,359 B2
(45) Date of Patent: Apr. 2, 2019

(54) SYSTEM AND METHOD FOR TREATING WASTEWATER

(71) Applicant: New Environmental Engineering, Inc., San Pedro, CA (US)

(72) Inventor: John Stewart Lang, Los Angeles, CA (US)

(73) Assignee: New Environmental Engineering, Inc., San Pedro, CA (US)

( * ) Notice: Subject to any disclaimer, the term of this patent is extended or adjusted under 35 U.S.C. 154(b) by 47 days.

(21) Appl. No.: 15/595,431

(22) Filed: May 15, 2017

(65) Prior Publication Data
US 2017/0327395 A1 Nov. 16, 2017

Related U.S. Application Data

(60) Provisional application No. 62/391,924, filed on May 16, 2016, provisional application No. 62/498,867, filed on Jan. 10, 2017, provisional application No. 62/499,885, filed on Feb. 7, 2017.

(51) Int. Cl.
*C02F 3/12* (2006.01)
*C02F 3/20* (2006.01)
*C02F 1/00* (2006.01)

(52) U.S. Cl.
CPC .......... *C02F 3/1294* (2013.01); *C02F 3/121* (2013.01); *C02F 3/20* (2013.01); *C02F 2001/007* (2013.01); *Y02W 10/15* (2015.05)

(58) Field of Classification Search
CPC ........ B01F 3/0876; C02F 3/1294; C02F 9/00; C02F 3/121; C02F 3/1221; C02F 3/1284; C02F 2301/046

USPC ................. 210/197, 194, 626, 622
See application file for complete search history.

(56) References Cited

U.S. PATENT DOCUMENTS

| | | | |
|---|---|---|---|
| 719,273 A | 1/1903 | Stuart | |
| 996,560 A | 6/1911 | Bradley | |
| 2,020,850 A | 11/1935 | Myhren et al. | |
| 3,271,304 A | 9/1966 | Valdespino et al. | |
| 3,997,437 A | 12/1976 | Prince et al. | |
| 4,073,722 A | 2/1978 | Grutsch et al. | |
| 4,210,166 A | 7/1980 | Munie | |
| 4,645,603 A * | 2/1987 | Frankl | A01C 3/026 210/195.1 |
| 4,721,570 A * | 1/1988 | Ankaitis | C02F 3/082 210/151 |
| 5,179,858 A | 1/1993 | Atwood | |
| 5,314,622 A | 5/1994 | Stirling | |
| 5,344,563 A | 9/1994 | Noyes | |
| 5,509,349 A | 4/1996 | Anderson et al. | |
| 6,568,660 B1 | 5/2003 | Flanbaum | |
| 6,984,325 B1 | 1/2006 | Venable | |

(Continued)

OTHER PUBLICATIONS

Notification of Transmittal of the International Search Report and the Written Opinion of the International Searching Authority, of the Declaration, PCT/US17/032705 dated Aug. 4, 2017.

(Continued)

*Primary Examiner* — Claire A Norris
(74) *Attorney, Agent, or Firm* — Eleanor M. Yost; Carlton Fields Jorden Burt, PA

(57) ABSTRACT

The invention comprises an activated sludge treatment system and process that aerates wastewater undergoing treatment using venturis.

13 Claims, 12 Drawing Sheets

(56) References Cited

U.S. PATENT DOCUMENTS

| | | | |
|---|---|---|---|
| 7,614,614 | B2 | 11/2009 | Sabadicci et al. |
| 2001/0052499 | A1 | 12/2001 | Nikima |
| 2007/0007214 | A1 | 1/2007 | Zha et al. |
| 2008/0078719 | A1 | 4/2008 | Fabiyi et al. |
| 2009/0020475 | A1 | 1/2009 | Jordan |
| 2014/0367330 | A1* | 12/2014 | Liu .................. C02F 3/307 210/605 |
| 2015/0122709 | A1 | 5/2015 | Sosa-Sanchez |
| 2016/0122216 | A1 | 5/2016 | Stark |

OTHER PUBLICATIONS

Terasaka, Koichi, Ai Hirabayashi, Takanori Nishino, Ssatoko Fujioka, Daisuke Kobayshi. (2011). Develoment of microbubble aerator for waste water treatment using aerobic activated sludge. Chemical Engineering Science, 66, 3172-3179 Feb. 25, 2011.

South African Water Research Commission, Case Study SA-JW2; http://www.wrc.org.za/Lists/Knowledge%20Hub%20Items/Attachments/10297/SA-JW2%20-%20Jhb%20Water%20-%20Fine-bubble%20aeration.docx. Jan. 6, 2013.

http://mazzei.net/wastewater-activated-sludge-aeration/ Sep. 1, 2012.

United State Environmental Protection Agency (2004). Primer for Municipal Wastewater Treatment Systems. EPA-832-R-04-001. Sep. 1, 2004.

http://www.nyc.gov/html/dep/html/wastewater/wwsystem-process.shtml Sep. 6, 2010.

https://en.wikipedia.org/wiki/Secondary_treatment Jan. 3, 2015.

Fair, G.M., Geyer, J. C., and Okun, D. A., "Water and Wastewater Engineering" V 2, John Wiley &Sons, Inc. 1968, p. 35-28, Figure 35-9 c Dec. 31, 1968.

https://www.xylem.com/en-US/brands/sanitaire/ Jan. 1, 1978.

Notification of Transmittla of the International Search Report and the Written Opinion of the International Searching Authority, or the Declaration Jul. 11, 2018.

* cited by examiner

SYSTEM AND METHOD FOR TREATING WASTEWATER

CROSS-REFERENCE TO RELATED APPLICATIONS

This application claims priority from U.S. Provisional Patent Application Ser. No. 62/391,924, filed May 16, 2016; U.S. Provisional Patent Application Ser. No. 62/498,867, filed Jan. 10, 2017; and U.S. Provisional Patent Application Ser. No. 62/499,885, filed Feb. 7, 2017, all incorporated herein in their entirety.

FIELD OF THE INVENTION

This invention relates to wastewater treatment, and more specifically, to a new system and method for treating domestic, municipal, agricultural, and industrial wastewater.

BACKGROUND OF THE INVENTION

The mixture of fecal matter and water is commonly referred to as "sewage" or "wastewater" by sanitary engineers. For hundreds of years, mankind used flowing water to transport sewage elsewhere so as to be able to live in more pleasant surroundings. Many cities built sewers to convey sewage into bodies of water. These bodies of water could be freely flowing, such as rivers, and streams; or terminal, such as seas, lakes, and ponds. For example, sanitary waste was disposed of in Boston's early storm-sewer system, which discharged the untreated waste into the Charles River (then Boston's water supply) and Boston Harbor. Additionally, sewers were built that conveyed sewage directly onto dry land.

Sewers today go beyond just dumping sewage into a waterway. They now treat the sewage before it is put back into the ecosystem. Expansive sewage treatment facilities separate the solids and treat the sewage with bacteria and chemicals that make it safe to introduce back into the environment. Solids left over from the treatment process are even reused as fertilizer.

Fecal material biodegrades via aerobic and anaerobic processes, depending on whether oxygen is present. Sewage treatment facilities use, among other things, bacteria to digest sewage. Bacteria ingest the organic material in sewage to grow and produce more bacteria. Along with the bacteria, carbon dioxide and water are the principal end-products of aerobic sewage degradation. Following the degradation process, the oxygen content of the water will be decreased. The rate of bacterial growth is limited by the amount of oxygen available. For decades, sanitary engineers have sought to increase or "speed up" aerobic degradation processes by increasing the amount of oxygen available. One such method is referred to as "activated sludge treatment," or "AST".

Activated Sludge Treatment

The activated sludge treatment process is employed in more than 80% of all treatment plants in the field of home, municipal, and biodegradable industry wastewater treatment.

The basic principle behind all activated sludge processes is that as microorganisms grow, they form particles that clump together. These particles ("floc") are allowed to settle to the bottom of a tank, leaving a relatively clear liquid free of organic material and suspended solids. Described simply, wastewater is mixed with varying amounts of recycled liquid containing a high proportion of organisms taken from a secondary clarifying tank, and it becomes a product called mixed liquor. This mixture is typically stirred and injected with large quantities of air, to provide oxygen and keep solids in suspension. After a period of time, mixed liquor flows to a clarifier where it is allowed to settle. A portion of the bacteria is removed as it settles, and the partially cleaned liquid flows on for further treatment. The resulting settled solids, the so-called "activated sludge," are returned to the first tank to begin the process again.

Broadly speaking, the basic activated sludge process typically takes place in a system comprising several interrelated components, including, for example: (1) a tank where the biological reactions occur, sometimes referred to as an aeration tank; (2) a source that provides oxygen and mixing; (3) a tank, known as the clarifier, where the solids settle and are separated from treated wastewater; and (4) a means of collecting the solids either to return them to the aeration tank (in the form of "return activated sludge" or "RAS"), or to remove them from the process (known as "waste activated sludge" or "WAS").

AST is frequently employed in a multi-part wastewater treatment ("WWT") system. Such systems include plug flow reactors, continuously stirred tank reactors, and mixed-flow reactors. One or more reactors can be used. While it is most common to use only one type of reactor in a particular plant, different types of reactors can be used in the same plant. In the case where there is more than one reactor in a WWT plant, the reactors may be connected in series, in parallel, or in a series/parallel connection. The steps that take place in this system are usually referred to as "primary treatment," "secondary treatment," and "tertiary treatment." These steps are typically used in series, from first to last; but all of the steps may not be used in all cases, and steps may be repeated as desired.

Additional steps may be also included, e.g., pre-treatment to remove materials that can be collected from the raw sewage before they damage or clog the pumps and sewage lines of primary treatment clarifiers. Objects commonly removed during pre-treatment include trash, tree limbs, leaves, branches, and other large objects. In New York City, for example, several stories underground, wastewater flows into the plants from sewers connected to homes and businesses. The incoming wastewater, called influent, passes through screens consisting of upright bars, spaced one to three inches apart. These bars remove large pieces of trash including rags, sticks, newspaper, soft drink cans, bottles, plastic cups and other similar items. This protects the main sewage pumps and other equipment. The garbage is transported to landfills. The main sewage pumps then lift the wastewater from the screening chamber to the surface level of the plant. See "New York City's Wastewater Treatment System," available at: http://www.nyc.gov/html/dep/html/wastewater/wwsystem-process.shtml.

As will be well-known to one of ordinary skill in the art, the term "activated sludge treatment" can be used to describe several steps in the process (e.g., both the primary and secondary treatments together, or the biological growth portion of secondary treatment stage alone).

A number of variations of the basic process have been developed, including extended aeration, sequencing batch reactors, and oxidation ditches. The activated sludge plant is the most popular biological treatment process for larger installations or small package plants being used today. These plants are capable of producing a high quality effluent for the price. Another advantage of the activated sludge process is the low construction cost.

The activated sludge treatment process has several disadvantages, though. The efficiency of treatment varies widely during the course of any treatment process, giving widely-varying pollution results. Additionally, depending on the aeration method employed, the process can be very expensive.

Therefore, an activated sludge treatment system and process that overcome these and other drawbacks in the art is desired. Additionally, an activated sludge treatment system and process that requires less energy input and as a result, costs less, is also desired.

Primary Treatment. In primary treatment, raw sewage is mechanically sorted to remove the solid part of the sewage stream from the liquid part. Primary treatment is also sometimes referred to by those skilled in the art as the primary sedimentation stage.

In one example, sewage flows through large tanks, commonly called pre-settling basins, primary chambers, primary sedimentation tanks, or primary clarifiers. Primary settling tanks can be equipped with mechanically-driven scrapers that continually drive the collected sludge towards a hopper in the base of the tank where it is pumped to sludge treatment facilities, where, for example, it can be dried and sterilized and disposed of, usually by land-filling. Removing suspended solid waste reduces the wastewater's biochemical oxygen demand ("BOD")—the amount of oxygen microorganisms must consume to breakdown the organic material present in the wastewater.

In New York City, for example, the wastewater (following pre-treatment) enters primary settling tanks or sedimentation tanks, for one to two hours. The flow of the wastewater is slowed, allowing heavier solids to settle to the bottom of the tank and the lighter materials to float. At the end of the process, the floatable trash, such as grease and small plastic material, rises and is skimmed from the top of the tank's surface. The settled solids, called primary sludge, are then pumped through cyclone degritters—devices that use centrifugal force to separate out sand, grit (such as coffee grinds) and gravel. This grit is removed, washed, and taken to landfills. The degritted primary sludge is pumped to the plant's sludge handling facilities for further processing. The partially treated wastewater from the primary setting tanks (called primary-treated wastewater) then flows to the secondary treatment system.

Secondary Treatment. In secondary treatment, wastewater undergoes a biological process to remove dissolved and suspended organic compounds. After this kind of treatment, the wastewater may be called secondary-treated wastewater.

The process typically includes a liquid sewage stream that flows to a managed aerobic habitat wherein the stream's organic compounds are sequestered by being ingested by naturally-occurring microbes like bacteria and protozoa, which convert biodegradable soluble organic contaminants (e.g., sugars, fats, and organic short-chain carbon molecules from human waste, food waste, soaps and detergent) into, e.g., carbon dioxide and water. These microbes clump together and form floating particles. This biological process takes place in a suitable reactor that includes a means of adding oxygen to facilitate aerobic bacterial growth, and a means of keeping the sludge particles in suspension (e.g., a mixing basin or chamber, or aeration tank). Overflow from the mixing basin may be sent to a secondary clarifier, where the suspended biological floc settles out while the treated water moves into tertiary treatment or disinfection. The settled sludge can be sent to terminal processing and disposal. Settled sludge can also be returned to the mixing basin to continue growing in primary effluent. The returned sludge is called "return activated sludge" or "RAS."

In New York City, for example, in the secondary treatment process, air and "seed" sludge are added to the wastewater to break it down further. Air pumped into large aeration tanks mixes the wastewater and sludge that stimulates the growth of oxygen-using bacteria and other organisms that are naturally-present in the sewage. These beneficial microorganisms consume most of the remaining organic materials that are polluting the water and this produces heavier particles that will settle later in the treatment process. Wastewater then passes through these bubbling tanks in three to six hours. The aerated wastewater then flows to the final settling or sedimentation tanks, which are similar to the primary settling tanks. Here, the heavy particles and other solids settle to the bottom as secondary sludge. Some of this sludge is re-circulated back to the aeration tanks as "seed" to stimulate the activated sludge process. The returned sludge contains millions of microorganisms that help maintain the right mix of bacteria and air in the aeration tank and contribute to the removal of as many pollutants as possible. The remaining secondary sludge is removed from the settling tanks and added to the primary sludge for further processing in the sludge handling facilities. Wastewater passes through the settling tanks in two to three hours and then flows to the tertiary treatment stage (e.g., filtration or disinfection.)

The secondary treatment process may encompass a variety of mechanisms and processes using dissolved oxygen to promote growth of the biological floc that removes organic material. But, as discussed above, biological oxidation processes are sensitive. For example, the rate of biological reactions increase with temperatures between 0° C. and 40° C. Most surface aerated vessels operate at between 4° C. and 32° C. Elevated concentrations of toxic wastes including pesticides, industrial metal plating waste, or extreme pH, can kill the biota of an activated sludge reactor ecosystem.

The amount of oxygen available during the secondary treatment process is also important. Most secondary treatment processes include an aeration step. Aeration serves two important purposes: supplying the required oxygen to the organisms to grow and providing optimum contact between the dissolved and suspended organic matter and the microorganisms, by driving the cross roll current that keeps the floc suspended. The aeration system consumes approximately 70 to 80 percent of the net power demand for a typical activated sludge wastewater treatment plant; therefore, the efficiency of different aeration systems is an important consideration. The time that the mixed liquor is aerated varies from as little as 30 minutes to as much as 36 hours, depending upon the treatment process used. The quality of wastewater that is released after treatment is measured in part by the amount of suspended solids or "SS" present in solution, usually in milligrams per liter. The EPA has standards for BOD and SS discharge from wastewater treatment plants.

Aeration is usually performed mechanically or by using a diffused system. Mechanical aerators physically splash the wastewater into the atmosphere above the tank and create turbulence causing wastewater mixing. Mechanical aerators include brushes, blades, or propellers that introduce air from the atmosphere. Surface aerators float at the surface or are mounted on supports in or above the basin. Mechanical aerators tend to incur lower installation and maintenance costs. A diffused air system introduces compressed air through a perforated membrane into the wastewater. Diffusers are classified by the physical characteristics of the equipment, or by the size of the air bubble. The choice of bubble size, diffuser type, and diffuser placement can have a great effect on the efficiency of the aeration process. Porous (fine bubble) diffusers are attached to the bottom of the tank or positioned just below the surface. They are available in various shapes and sizes, such as discs, tubes, domes, and plates. Fine pore diffusers introduce air in the form of very small bubbles, maximizing the contact time the air bubbles have with the mixed liquor and encouraging mixing, while at the same time, discouraging deposits on the tank bottom. These fine pore diffusers produce a high oxygen transfer efficiency, but they are susceptible to chemical or biological fouling and as a result, require routine cleaning. Nonporous (course bubble) diffusers usually have fixed or valved orifices. Due to the larger bubble size, nonporous diffusers produce lower oxygen transfer efficiencies. Other diffusion devices include aspirator aerators that use a propeller on the end of a hollow shaft, creating a vacuum as the propeller draws air from the atmosphere and disperses it into the wastewater.

Tertiary Treatment. The highest level of wastewater treatment is tertiary treatment, which is any process that goes beyond the previous steps to further remove contaminants or specific pollutants. Even after primary and secondary treatment, disease-causing organisms may remain in the treated wastewater. In tertiary treatment, the secondary effluent can be polished by physical processes, biological processes, or a combination thereof. For example, the most common tertiary treatment is filtration. Another example is disinfection. Tertiary treatment is typically used to remove phosphorous or nitrogen, which cause eutrophication. In some cases, treatment plant operators add chlorine as a disinfectant before discharging the water. Tertiary treatment can produce potable water.

In New York City, for example, to disinfect and kill harmful organisms, the wastewater spends a minimum of 15-20 minutes in chlorine-contact tanks mixing with sodium hypochlorite. The treated wastewater, or effluent, is then released into local waterways.

SUMMARY OF THE INVENTION

The invention comprises, in one form thereof, an activated sludge treatment system and process that aerates wastewater undergoing treatment using an air/liquid mixture discharged from venturis.

More particularly, in one embodiment, the invention includes an activated sludge treatment system for treating wastewater, comprising one or more primary treatment tanks adapted to settle solids out of polluted influent with at least one flow equalization channel connected to a secondary treatment tank; one or more secondary treatment tanks adapted to digest organic materials in primary-treated wastewater with aerobic micro-organisms, comprising a liquid distribution manifold connected to one or more venturis suspended within the one or more secondary treatment tanks, wherein said one or more venturis are adapted to discharge an air/liquid mixture into said one or more secondary treatment tanks, and an air distribution manifold connected to the one or more venturis suspended within the one or more secondary treatment tanks; at least one collection channel connected to a secondary treatment tank and adapted to deliver secondary-treated wastewater to one or more sedimentation tanks; one or more sedimentation tanks, wherein the one or more sedimentation tanks are connected directly or indirectly to one or more return activated sludge pipelines; one or more return activated sludge pipelines adapted to carry return activated sludge to the one or more secondary treatment tanks; one or more return activated sludge pumps adapted to pump return activated sludge through the one or more return activated sludge pipelines; one or more secondary supernatant discharge lines connected to the one or more sedimentation tanks; one or more secondary supernatant pumps adapted to pump secondary supernatant from the one or more sedimentation tanks through the one or more secondary supernatant discharge lines to the liquid distribution manifold; and one or more air compressors adapted to pump air to the air distribution manifold.

In another form, one embodiment of the invention includes a method for treating wastewater using an activated sludge treatment process. The method comprises the steps of primary treatment, secondary treatment, secondary treatment using venturis to aspirate air into the wastewater undergoing secondary treatment, and tertiary treatment, if desired. A process for treating wastewater, comprising conveying polluted influent to one or more primary treatment tanks where solids are settled out of the polluted influent to create primary-treated wastewater; conveying the primary-treated wastewater to a flow equalization channel connected to a secondary treatment tank where aerobic micro-organisms digest organic materials in the primary-treated wastewater to create secondary-treated wastewater, wherein said secondary treatment tank comprises one or more liquid manifolds connected to one or more venturis suspended within the secondary treatment tank and an air distribution manifold connected to the one or more venturis suspended within the treatment tanks; conveying secondary-treated wastewater from the secondary treatment tank through a collection channel to a sedimentation tank where solids are settled out of the secondary-treated wastewater to create secondary supernatant and activated sludge; conveying a portion of the activated sludge from the sedimentation tank through a return activated sludge pipeline to the flow equalization channel using a return activated sludge pump; conveying a portion of the secondary supernatant from the sedimentation tank through a secondary supernatant discharge line to the one or more liquid manifolds using a secondary supernatant pump; conveying secondary supernatant through the one or more liquid manifolds to the one or more venturis; pumping air from one or more air compressors through the one or more air distribution manifolds to the one or more venturis; mixing secondary supernatant with air in the one or more venturis to create an air/supernatant mixture; expelling the air/supernatant mixture from the one or more venturis into the secondary treatment tank to aerate wastewater undergoing treatment; and discharging the remaining secondary supernatant from the sedimentation tank to a tertiary processing tank.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
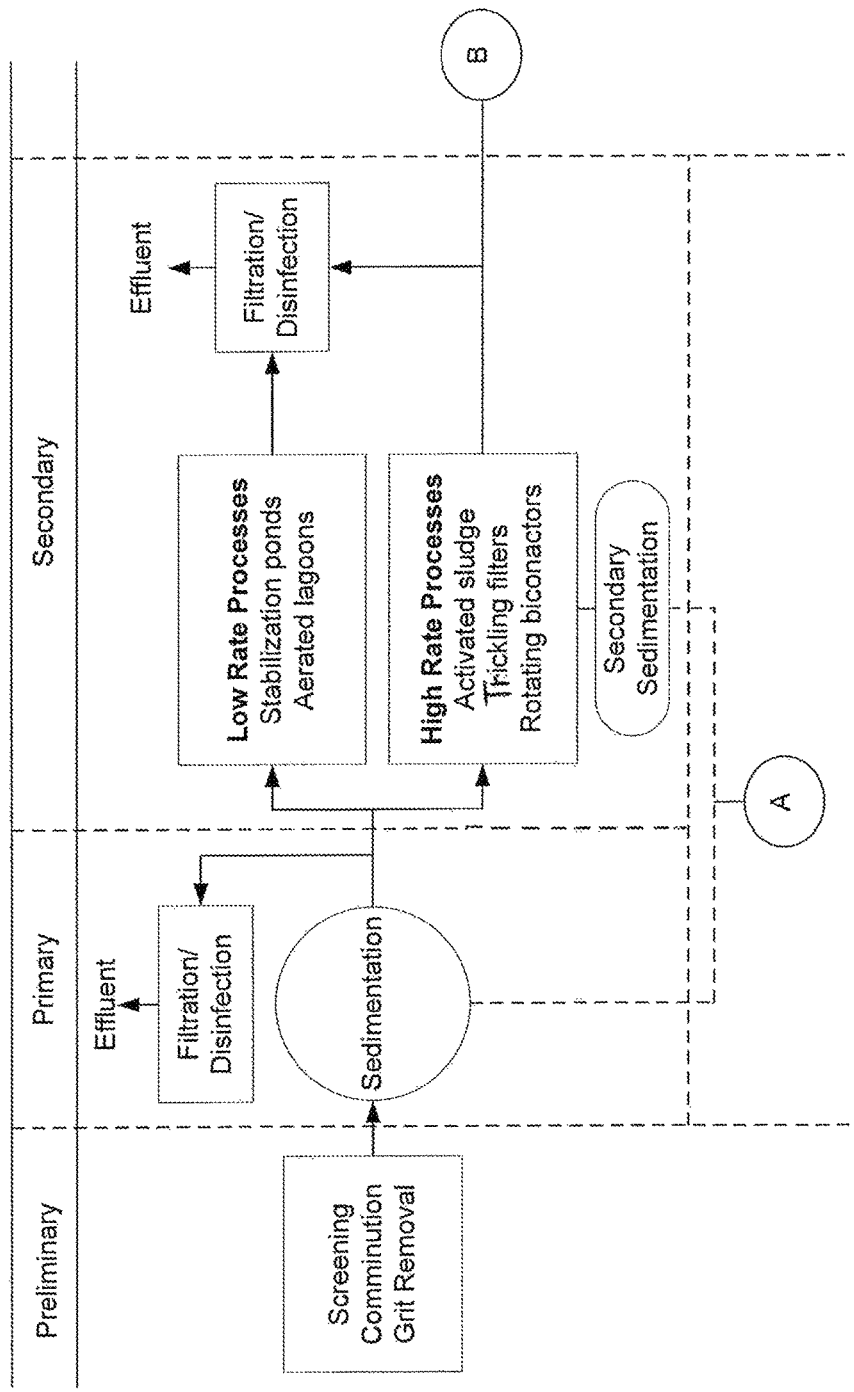
FIG. 1 is a flow diagram of conventional wastewater treatment processes according to the prior art.
Figure 1A:
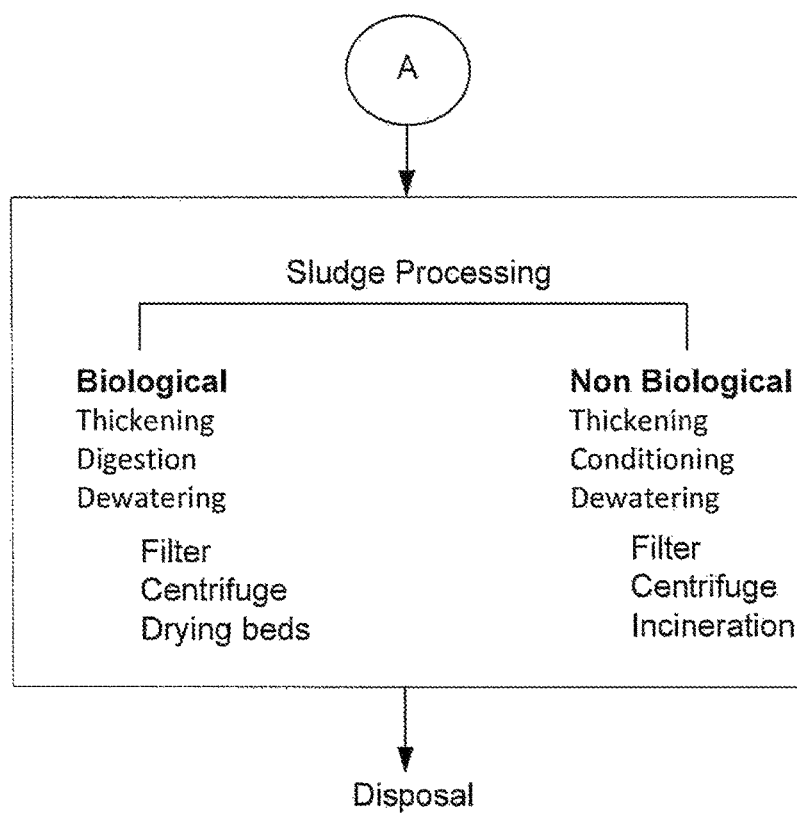
FIG. 1A is a detail view of portion "A" of FIG. 1.
Figure 1B:
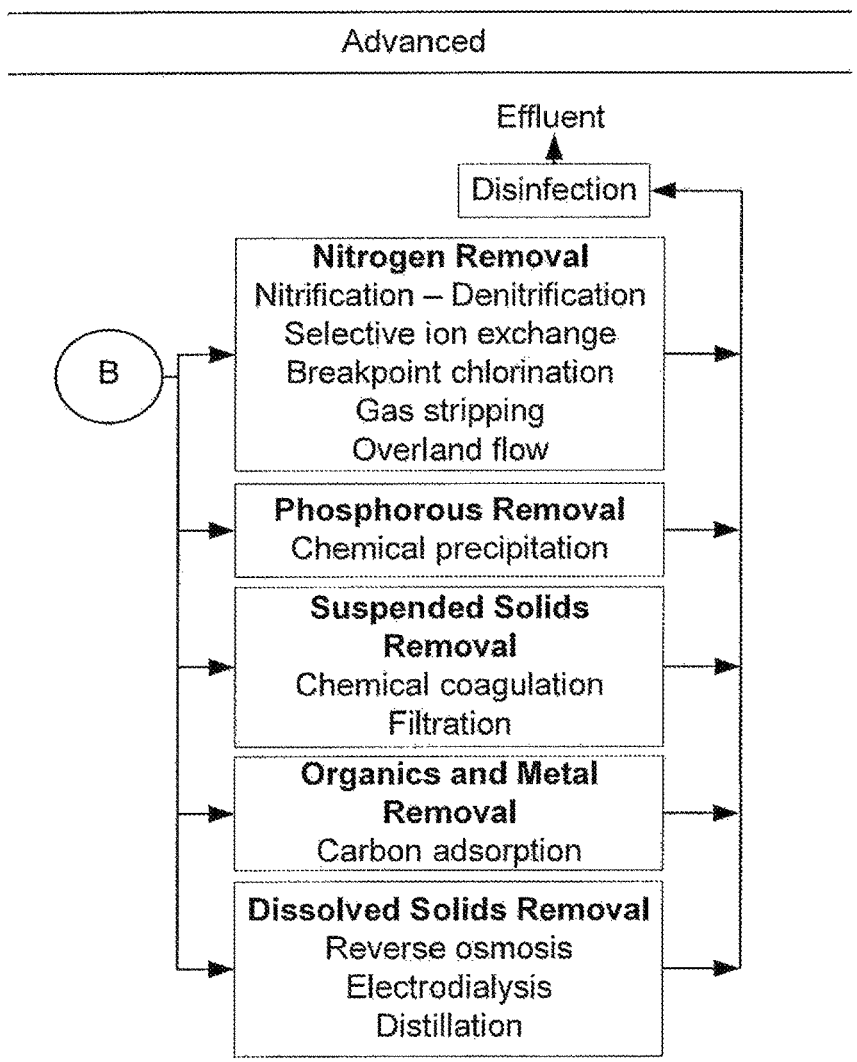
FIG. 1B is a detail view of portion "B" of FIG. 1.

Referring to FIG. 1, there is shown a flow diagram for various municipal wastewater treatment processes as known in the art. Conventional wastewater treatment consists of a combination of physical, chemical, and biological processes and operations to remove solids, organic matter, nutrients, and/or pollutants from wastewater. General terms used to describe different degrees of treatment, in order of increasing treatment level, are pre- or preliminary, primary, secondary, and tertiary and/or advanced wastewater treatment.

Figure 2:
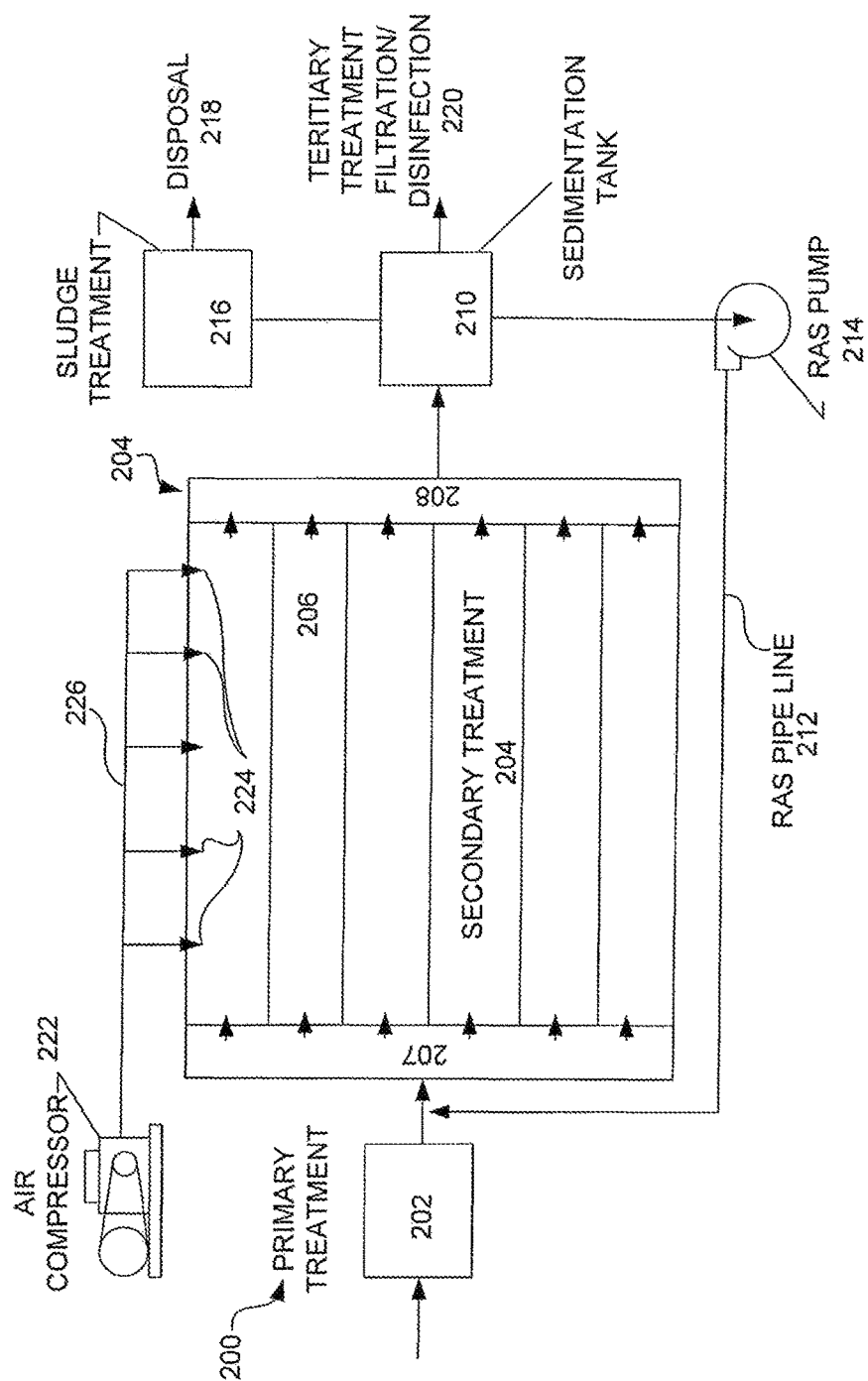
FIG. 2 is a diagram view of a conventional activated sludge treatment system according to the prior art.

Referring to FIG. 2, there is shown a flow diagram of a conventional activated sludge treatment system as currently known in the art. The primary treatment phase 200 includes a primary tank 202. Influent containing pollutants (e.g., raw sewage) flows into tank 202 via an influent line and is retained for an amount of time sufficient to settle solids (e.g., large organic and inorganic solids) to the bottom of the tank 202. Settled solids build up over time (primary sludge) and can be removed from the bottom of tank 202 by any means known to those of ordinary skill in the art, including, for example, sludge rakes that scrape the sludge to a central well or hopper from which it is pumped to sludge processing units/treatment facilities, where, for example, it can be dried and sterilized and disposed of. Scum can be swept across the tank surface by water jets or mechanical means from which it is also pumped to sludge processing units.

Primary-treated wastewater exits tank 202 via a flow line and enters the secondary treatment phase 204 by any appropriate means known to those of skill in the art (e.g., by pipes, lines, gravity via an open channel, orifice in a dividing wall), which includes one or more aeration tanks 206. A flow equalization channel 207 (also referred to as a flow distribution channel) made of, e.g., cast concrete, may be built onto the head-end of each aeration tank 206 to split the sewage flow so that each aeration tank 206 receives a particular or substantially equal portion of sewage. In the aeration tank the primary-treated wastewater is acted upon by, e.g., microbes, which digest organic matter. Following secondary treatment, secondary-treated wastewater (also called secondary effluent) exits each aeration tank 206 by any appropriate means known to those of skill in the art (e.g., by pipes, lines, gravity via an open channel, orifice in a dividing wall) and enters into one or more collection channels 208, which convey the secondary-treated wastewater to one or more sedimentation tanks 210 for additional time sufficient to allow additional sludge to settle.

A portion (typically, 10-20% of the total sludge volume) of the settled sludge from the one or more sedimentation tanks 210 is removed and conveyed to return activated sludge pipeline 212 by one or more return activated sludge pumps 214 (e.g., a clog-resistant centrifugal pump), to be ultimately mixed with the primary-treated wastewater in the flow in, e.g., the flow equalization channel 207. The remainder of the settled sludge in sedimentation tank 210 is delivered to one or more sludge processing units/treatment facilities 216 for further processing or on to ultimate disposal 218.

The liquid in sedimentation tank 210 is delivered (e.g., by gravity flow, pumping, etc.) either to further secondary treatment or tertiary or other advanced treatment 220.

Figure 3A:
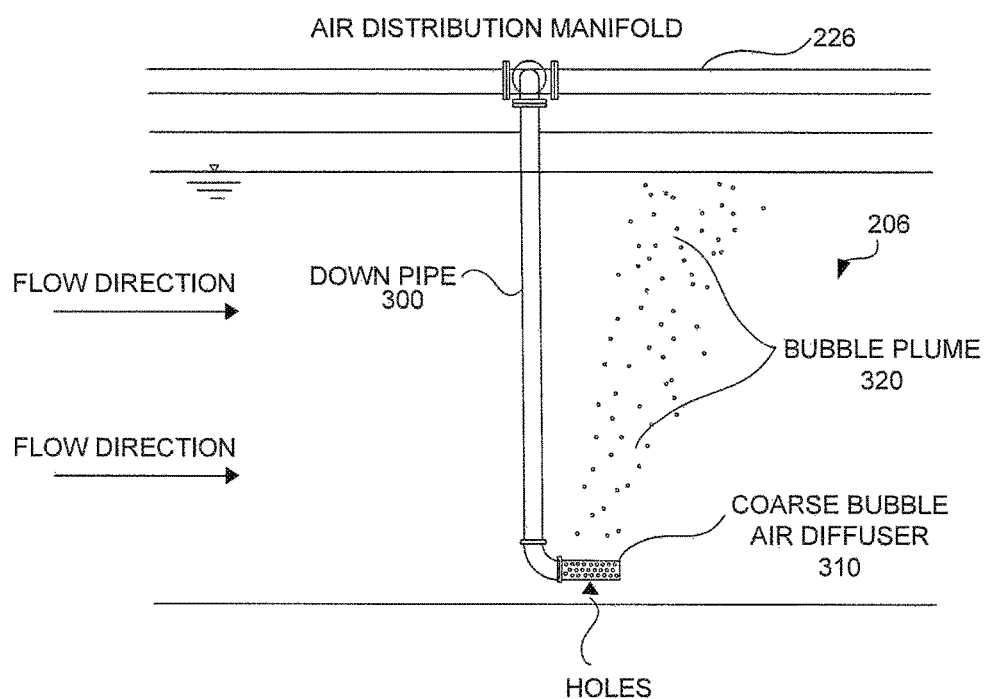
FIG. 3A is a diagram view of conventional aeration using a coarse bubble air diffuser according to the prior art.
Figure 3B:
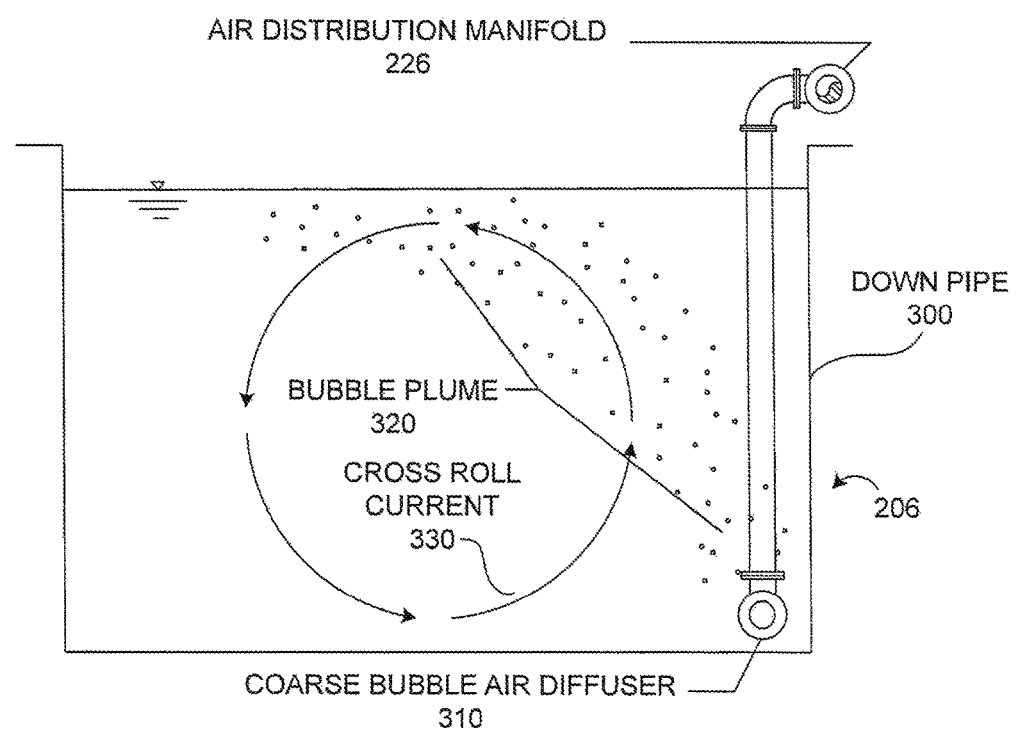
FIG. 3B is another diagram view of a conventional aeration process using a coarse bubble air diffuser according to the prior art.

Returning to aeration tank(s) 206, a suitable air compression device 222, such as an air compressor, pressurizes atmospheric air and sends it through pipes or any suitable means to one or more air diffusers 224. An exemplary air compression device 222 may include a motor, a vent whereby atmospheric air is drawn in, and a conduit to conduct the air. Each aeration tank may include any number of suitable diffusers 224 and/or diffuser manifolds 226. Diffuser manifold 226 serves compressed air to one or more down pipes 300, as shown in FIG. 3A, submerged in the tank 206. Diffusers 224 include holes for the release of air into the wastewater. For example, a coarse bubble air diffuser 310 (an example of a type of diffuser 224), is attached to the end of each down pipe 300. A bubble plume 320 rises from each coarse bubble air diffuser 310. As the concentration of air inside the bubbles is greater than that in the sewage outside of the bubbles, air passes through the gas-liquid interface of the bubbles, from the bubbles into the sewage. The buoyancy of the bubble plume 320 creates a cross roll current 330 in the aeration tank 206, as shown in FIG. 3B. This cross roll current suspends agglomerated aerobic bacteria or microbes in the wastewater, which otherwise would settle to the bottom of the tank 206, where they would not serve their purpose. In some cases, the combination of the flow velocity of sewage through the tank 206 and the cross roll current 330 produces a spiral current that flows down-stream through the tank 206. In aeration tanks that are common in large wastewater treatment facilities (e.g., plug flow reactors) the spiral current is a natural product of the cross roll and the forward motion of mixed liquor through the aeration tank. This current is necessary for proper operation. Without the current, floc would settle to the bottom of the tanks and treatment would stop.

Figure 4:
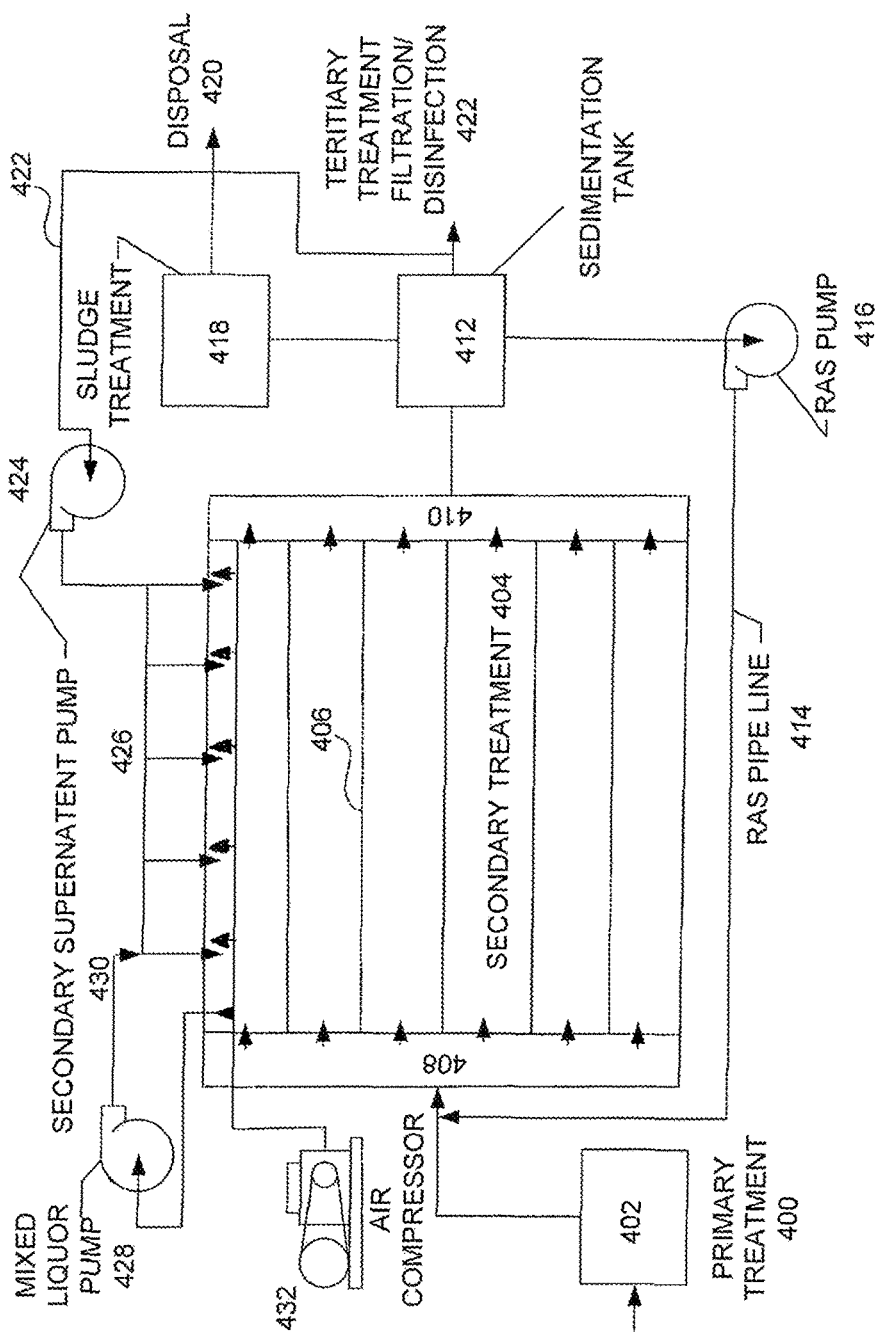
FIG. 4 is a diagram view of one embodiment of an activated sludge treatment system of the present invention.

FIG. 4 illustrates one embodiment of the activated sludge treatment system and process of the present invention. The primary treatment phase 400 includes a primary tank 402. Primary sedimentation tanks or clarifiers may be of any suitable shape and size, including round or rectangular basins, and are typically 3 to 5 m deep if used in an averaged-sized municipal facility. Polluted influent, e.g., raw sewage, flows into primary treatment tank 402 via an influent line and is retained for an amount of time sufficient to settle solids, typically at least 2 to 4 hours. Settled solids (primary sludge) can be removed from the bottom of tank 402 by any means known to those of ordinary skill in the art (e.g., sludge rakes) after which it is sent for further processing in sludge processing units or dispourse. Scum, if existent, can be swept across the tank surface by any suitable means.

Primary-treated wastewater exits tank 402 and enters (e.g., by gravity through an open channel, pumping, or other method known to those of skill in the art) the secondary treatment phase 404, which includes one or more aeration tanks 406. A flow equalization channel 408 (e.g., made of cast concrete or other suitable material) may be built onto the head-end of each aeration tank 406 to split the sewage flow so that each tank 406 receives a particular amount or a substantially equal portion of sewage. In the aeration tank 406, the primary-treated wastewater is acted upon by microbes, e.g., bacteria, which digest organic matter in the wastewater. Following secondary treatment, secondary-treated wastewater exits each secondary treatment tank 406 (typically by gravity) and enters into one or more collection channels 410, which convey the secondary-treated wastewater to one or more sedimentation tanks 412 for 2 to 4 hours, where sludge settles and is separated from the secondary supernatant. In an alternative embodiment, sedimentation tanks 412, secondary treatment tank 406, and primary tank 402 are all the same tank, but the tank includes primary, secondary, and sedimentation chambers separated by, e.g., walls.

A portion of the settled sludge from the one or more sedimentation tanks 412 is removed and conveyed to return activated sludge pipeline 414 by one or more return activated sludge pumps 416 (e.g., a clog-resistant centrifugal pump), to be ultimately mixed with the primary-treated wastewater in, e.g., the flow equalization channel 408. The remainder of the settled sludge in sedimentation tank 412 is delivered to one or more sludge processing units/treatment facilities 418 (e.g., by gravity flow) for further processing or on to ultimate disposal 420.

Following treatment in one or more sedimentation tanks 412, a portion of the secondary supernatant liquid in sedimentation tank 412 is delivered either to further secondary treatment or tertiary or other advanced treatment (e.g., in a disinfection tank) 422.

Another portion (e.g., 5% or other amount suitable) of the secondary supernatant liquid in one or more sedimentation tanks 412 flows to the secondary supernatant discharge line 422, where it is pumped by secondary supernatant pump 424, to liquid manifold 426 to be directed to one or more venturis (see FIGS. 5-9) via, e.g., down pipes in the tank 406. In another embodiment, mixed liquor pump 428 pumps wastewater undergoing secondary treatment out of tank 406 through mixed liquor line 430 into manifold 426 to be directed to venturis. In yet a further embodiment, potable water is pumped via a water pump (not shown) into manifold 426 to be directed to venturis. As one of skill in the art will appreciate, the system of the present invention can use any fluid compatible with the activated sludge process, e.g., wastewater undergoing secondary treatment, secondary-treated wastewater, or potable water, alone or in combination.

A suitable air compression device such as air compressor 432 pressurizes atmospheric air and sends it through pipes into one or more air distribution manifolds (not shown) to be directed to venturis via, e.g., down pipes, or air pipes, where it mixes with the liquid, and is expelled into the tank 406. The discharge of the air/liquid mixture at high velocity by the venturis in the venturi, both mixes and aerates the wastewater undergoing secondary treatment. As will be appreciated by one of ordinary skill in the art, liquid and air manifolds are optional; the pumps can direct air/liquid directly to downpipe(s) and on to venturi(s).

Figure 5:
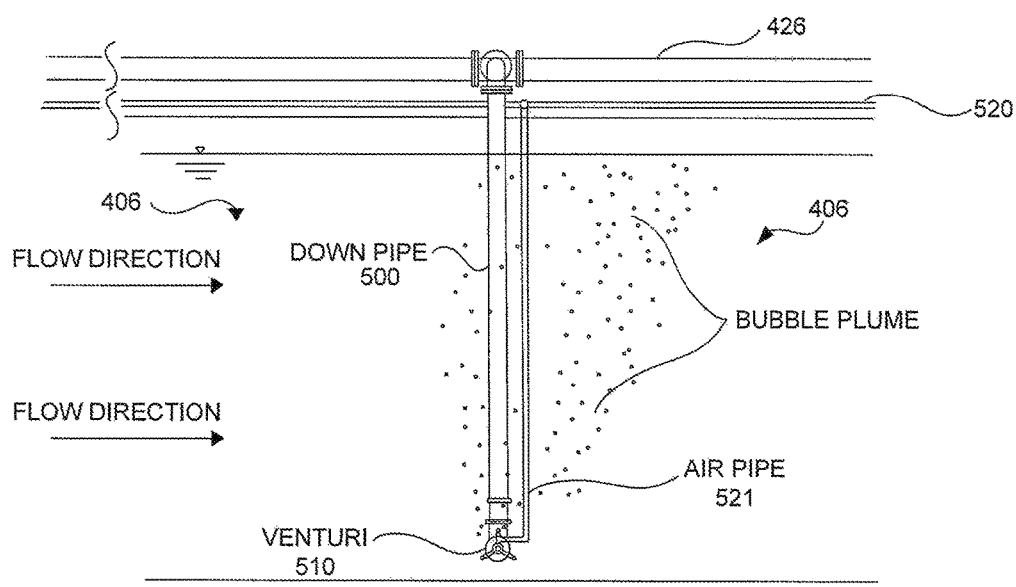
FIG. 5 is a diagram view of one embodiment of an aeration process using an exemplary venturi.

Turning to FIG. 5, venturi 510 is connected to down pipe 500 (or any intermediate pipes) by any means suitable in the art, e.g., a flange, a mechanical joint, or other coupling. The location of the venturi 510 may be in any suitable place in the tank, and in one embodiment, can be adjusted by adjusting, e.g., the length of down pipe 500.

As will be appreciated by one of ordinary skill in the art, air compressor 432 may be operable in this embodiment at lower capacity since it is pumping into the low pressure zone of a venturi.

Each aeration tank 406 may include any number of suitable liquid manifolds 426. Manifold 426 serves liquid to one or more down pipes 500 connected to venturis 510, submerged in the tank 406. Venturi 510 can discharge air and liquid directly into tank 406. Suitable joints connected to down pipes 500 facilitate easy removal of venturis 510 attached to their lower ends, for, e.g., periodic maintenance or adjustment. Venturi 510 is connected to down pipe 500 (or any air pipes, etc.) by any means suitable in the art, e.g., a flange, a mechanical joint, or other coupling.

Figure 6:
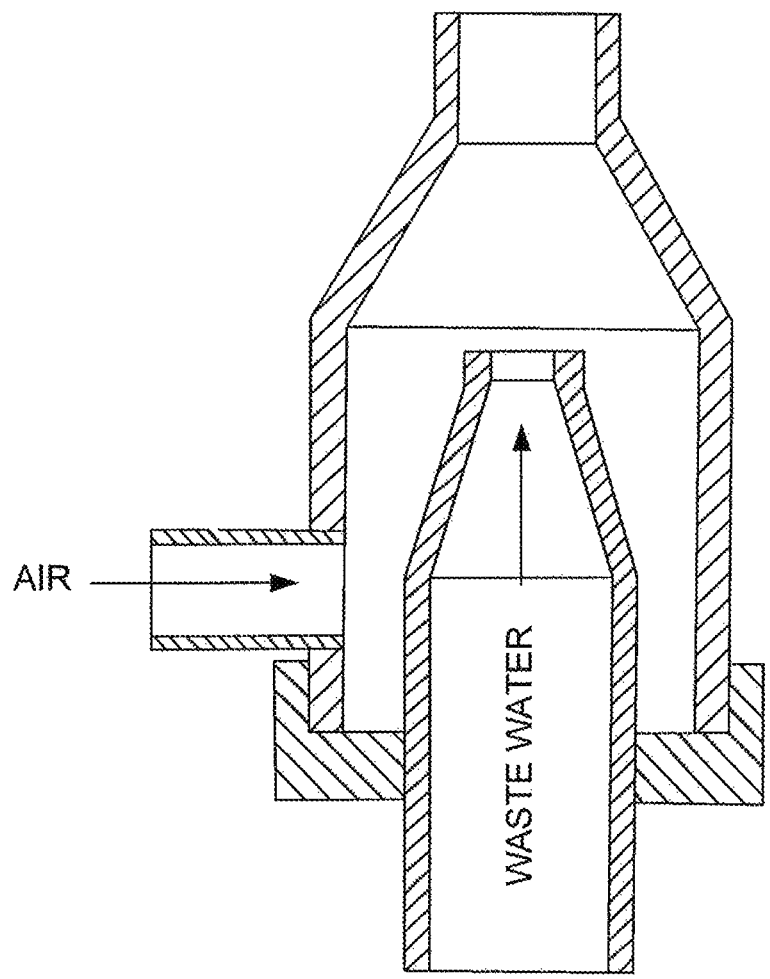
FIG. 6 is a cross-section view of an exemplary venturi used in one embodiment of the present invention.
Figure 7:
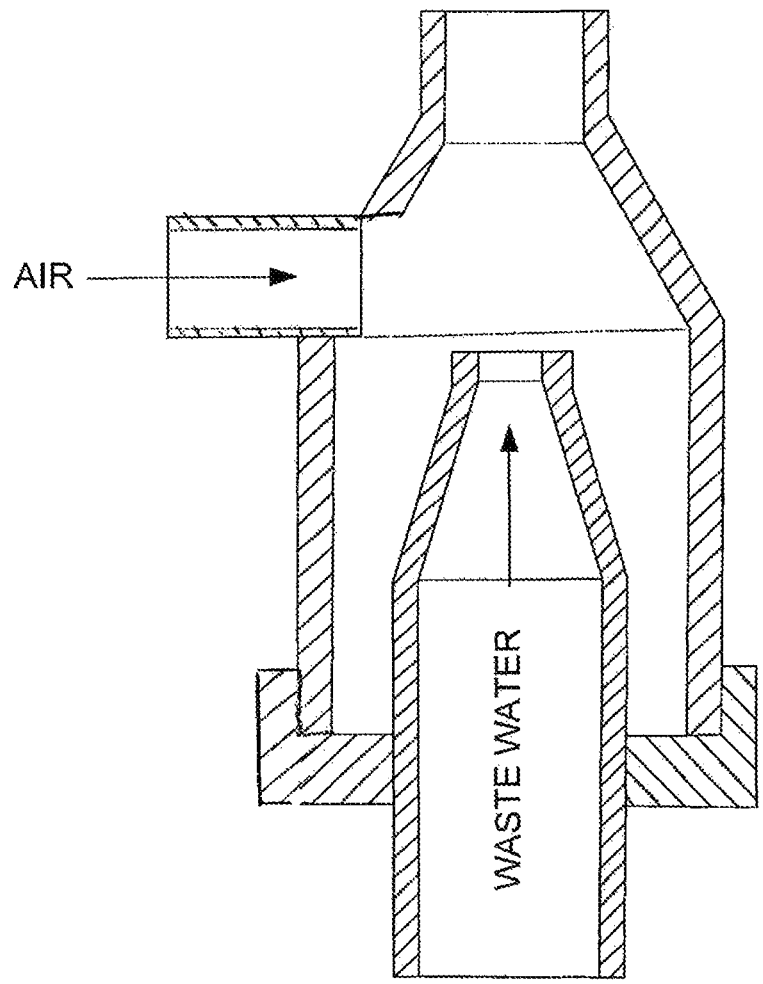
FIG. 7 is a cross-section view of another exemplary venturi used in one embodiment of the present invention.
Figure 8:
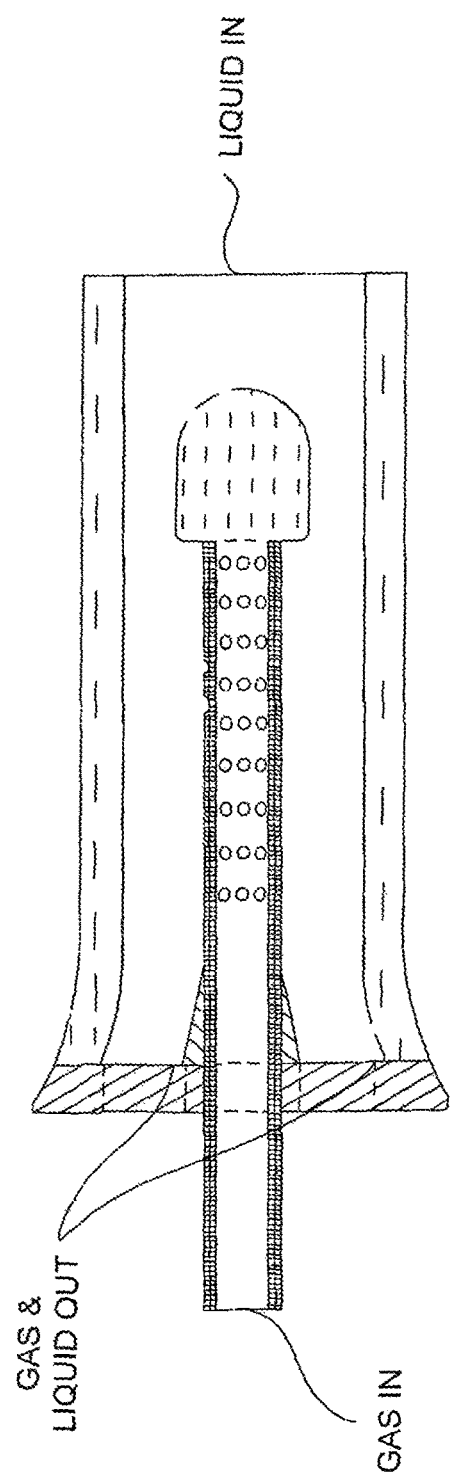
FIG. 8 is a cross-section view of yet another exemplary venturi used in one embodiment of the present invention.

Venturi 510 could be any suitable venture, including those shown in the several Figures. In one embodiment, venturi 510 is a short tube with a tapering constriction in the middle that causes an increase in the velocity of flow of a fluid, as shown in FIG. 6. In another embodiment, venturi 510 is the venturi described in U.S. patent application Ser. No. 10/147,210, incorporated herein in its entirety by reference. In that device, the aspiration point (the location in the device where gas first mixes with fluid) is located downstream from the venturi's jet nozzle, as shown in FIG. 7. In another embodiment, the aspiration point is located within the venturi jet barrel and fluid flow is constrained around the aspiration point by the physical walls of the device, allowing the venturi to be operated with lower fluid flow rates, as shown in FIG. 8. Other embodiments are envisioned, such as those shown in FIGS. 5 and 9.

The tank 406 may include additional mixing means to mix and/or circulate the wastewater in the tank. For example, a mixer may be a propeller, a turning blade, a Archimedes Screw, or any other suitable mixer as to known to those of ordinary skill in the art, located at any suitable location within the tank 406. Additionally or optionally, the tank 406 may include a surface aerator (e.g., spinning blades) located at or just below the surface of the wastewater that creates a fluid circulation.

Venturi 510 is connected to air compressor 432 via an air distribution manifold 520 or directly via air pipe 521. The air compressor delivers air via the manifold 520 and/or air pipe 521 to the venturis 510 to be mixed with the liquid flowing through the venturi 510 and expelled into the tank 406. In an alternative embodiment, the venturi 510 is attached to an air pipe that is exposed to the ambient air (e.g., above the surface of the tank), and the vacuum created by the liquid flowing in venturi 510 draws air down air the air pipe into venturi 510. In such an alternative embodiment, however, additional energy is required to operate the system (perhaps on the order of 10-100 times more) because significantly more liquid must be pumped to cause the venturis to aspirate atmospheric air as compared to where air is pumped into the venturis by an air compressor. Adding an air compressor to pump air to the venturis allows the secondary supernatant pump 424 to use less energy pumping liquid to the venturis, yet achieves similar aeration of the wastewater. Including both air and liquid pumps thus is more energy and cost efficient. Venturi 510 is connected to air pipe 521 by any means suitable in the art, e.g., a flange, a mechanical joint, or other coupling.

Figure 9:
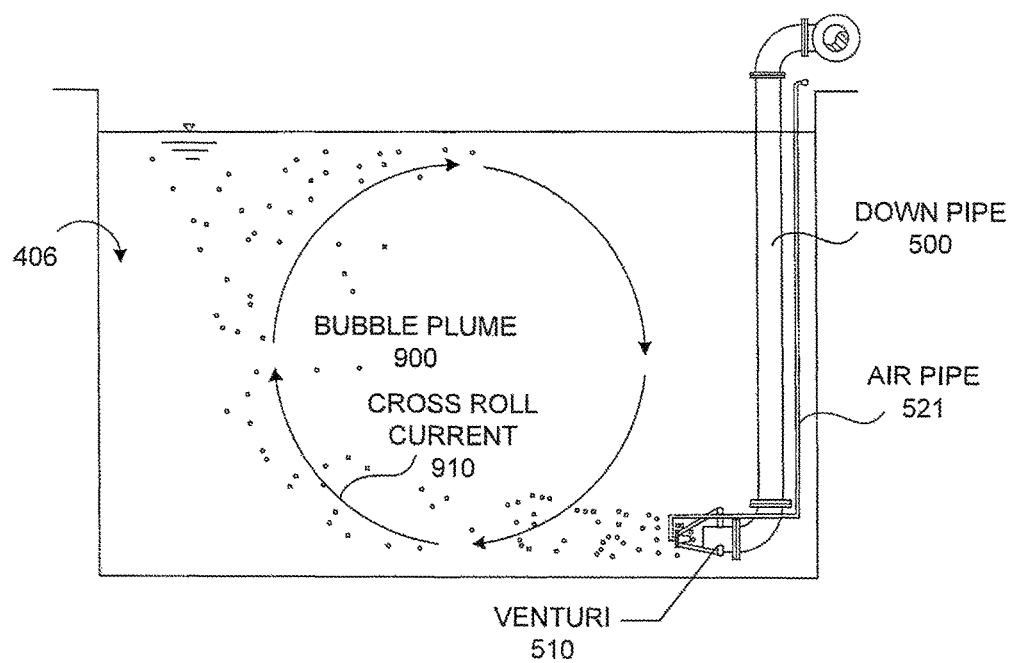
FIG. 9 is a diagram view of one embodiment of an aeration process using an exemplary venturi.

The hydraulic shear force created by the air and liquid flowing through venturi 510 produces micro air bubbles (>1 mm diameter) that, when discharged by venturi 510 into tank 406, moves through tank 406, transferring oxygen into the wastewater undergoing treatment. In one embodiment, venturi 510 creates a micro bubble plume 900. In another embodiment, as shown in FIG. 9, a cross roll current 910 is produced by the water jet-emerging from venturi 510 that flows down-stream through the tank 406. Because the air/water mixture is injected into the tank 406 with a high turbulence, the tank contents are intermixed, which prevent undesired deposits on the tank floor.

Venturis show very high rates of gas transfer, which results in more efficient aeration of the wastewater undergoing treatment. It is theorized that the rate of gas transfer from a submerged bubble is proportional to the inverse square of bubble diameter. Stated as a proportionality:

$$R_t \alpha 1/D^2 \qquad \text{Equation 1.}$$

Where $R_t$ is gas transfer rate and D is bubble diameter.

The gas transfer rate is the product of two factors: (1) the travel time for gas molecules to get from the interior of a bubble to its surface and (2) the molecule's rate of diffusion through the bubble's gas/liquid interface. In a small bubble, molecular velocity is determined by Brownian motion, which in turn is dependent on ambient temperature. Thus, in small submerged bubbles the temperature and average molecular velocity should be the same for all bubbles. So the average travel time for a molecule to move from a bubble's interior to its surface is inversely proportional to bubble diameter.

$$\tau \alpha 1/D \qquad \text{Equation 2.}$$

Where $\tau$ is the average travel time required for a molecule to move from the interior of a bubble to its surface.

The surface of a submerged gas bubble (i.e., the gas/liquid interface) is where a gas phase molecule can dissolve into the liquid phase. A molecule in a small bubble has a greater share of gas/liquid interface than a molecule in a larger bubble. Bubble volume is proportional to $D^3$. As bubble size shrinks, its volume and the number of molecules it contains is reduced by $1/D^3$. Bubble surface area is proportional to $D^2$. Also, as bubble size shrinks, its surface area is reduced by $1/D^2$. Thus, as bubble size shrinks, each molecule near its surface has a larger share of that surface. As a proportionality:

$$A_s \alpha 1/D \qquad \text{Equation 3.}$$

Where $A_s$ is bubble surface area occupied by a molecule adjacent to the bubble's surface.

It is plausible to presume that shorter travel time and a larger share of gas/liquid interface area both promote faster diffusion of gas from a submerged bubble into its surrounding liquid. Thus:

$$R_t = \tau \times A_s \qquad \text{Equation 4.}$$

and:

$$R_t \alpha 1/D^2 \qquad \text{Equation 5.}$$

In summary, a simple geometric analysis has been used to prove a previously unknown inverse square relationship governing gas-liquid mass transfer.

As will be apparent to one of ordinary skill in the art, the use of venturis in the activated sludge treatment system as described will decrease energy usage by an estimated to be 80-90% as compared to conventional systems. It is estimated that the total energy used for activated sludge treatment in the continental United Stated is in the range of 3-4% of electric power production. Eliminating half of the energy usage will forestall the construction of perhaps $2.5 billion worth of new electric generation and transmission facilities.

In monetary terms, retro-fitting existing wastewater treatment facilities with this described technology may save $800 million to $1 billion per year. Such savings will likely help slow the emission of carbon into the atmosphere.

Additional energy savings is attained by using small bubbles in the activated sludge treatment process rather than the large bubbles, as is used in common practice, to improve air transfer efficiency. Conventionally, the activated sludge treatment process used large bubbles to avoid clogging underwater air diffusion devices, such as coarse bubble air diffuser 310. Venturis, in contrast, produce small bubbles by dint of the strong hydraulic shear that occurs within the devices. Generally speaking, venturis are less likely to clog than currently utilized air diffusers because they have large bore orifices.

In alternative embodiments, existing wastewater treatment plants are retrofitted with the technology of the present invention.

In one embodiment, the air distribution manifold 226 of the system shown in FIG. 2 is disconnected from the air compressor 222, and repurposed to carry the secondary supernatant liquid to venturis, which themselves replace air diffusers 224, e.g., the coarse air diffusers 310. The secondary supernatant liquid is pumped by a new secondary supernatant pump out of sedimentation tank 210 to the repurposed manifold. Alternatively or additionally, a new mixed liquor pump 428 pumps wastewater undergoing secondary treatment out of the secondary treatment tank 206 into a liquid distribution manifold via lines to be directed to venturis and eventually back into the secondary treatment tank 206. A new air distribution manifold connected to an air compressor and air pipes can be installed to deliver air to the venturis, which is then mixed with the secondary supernatant flowing through the venturis to be expelled into the tank 206. It will be appreciated that the new air compressor may be operable in this embodiment at much lower capacity than the air compressor illustrated in FIG. 2.

In another embodiment, the air compressor 222, air distribution manifold 226, and down pipes 300 of the system shown in FIG. 2 is maintained. Down pipe 300, however, is connected to a venturi rather than a coarse bubble air diffuser 310. A new liquid distribution manifold system is installed to deliver a portion of the secondary supernatant liquid from sedimentation tank 210 through supernatant liquid lines through the new liquid distribution manifold to the venturis to be mixed with the air being pumped by air compressor 222. The secondary supernatant liquid is pumped by a new secondary supernatant pump. Alternatively or additionally, a new mixed liquor pump pumps wastewater undergoing secondary treatment out of the secondary treatment tank 206 into the new liquid distribution manifold to be directed to venturis to mix with pumped air and eventually back into the secondary treatment tank 206.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

I claim:

1. An activated sludge treatment system for treating wastewater, comprising:
   a) one or more primary treatment tanks adapted to settle solids out of polluted influent;
   b) at least one flow equalization channel;
   c) one or more secondary treatment tanks adapted to digest organic materials in primary-treated wastewater with aerobic micro-organisms, comprising:
      (i) a liquid distribution manifold connected to one or more venturis suspended within the one or more secondary treatment tanks, wherein said one or more venturis are adapted to discharge an air/liquid mixture into said one or more secondary treatment tanks, and
      (ii) an air distribution manifold connected to the one or more venturis suspended within the one or more secondary treatment tanks;
   d) at least one collection channel connected to the one or more secondary treatment tanks and adapted to deliver secondary-treated wastewater to one or more sedimentation tanks;
   e) wherein the one or more sedimentation tanks are connected directly or indirectly to one or more return activated sludge pipelines;
   f) said one or more return activated sludge pipelines being adapted to carry return activated sludge to the one or more secondary treatment tanks;
   g) one or more return activated sludge pumps adapted to pump return activated sludge through the one or more return activated sludge pipelines;
   h) one or more secondary supernatant discharge lines connected to the one or more sedimentation tanks;
   i) one or more secondary supernatant pumps adapted to pump secondary supernatant from the one or more sedimentation tanks through the one or more secondary supernatant discharge lines to the liquid distribution manifold; and
   j) one or more air compressors adapted to pump air to the air distribution manifold.

2. The system of claim 1, wherein said one or more secondary treatment tanks further comprise one or more mechanical aerators.

3. The system of claim 1, wherein the air distribution manifold is connected to the one or more venturis by one or more pipes.

4. The system of claim 1, further comprising one or more pre-treatment tanks wherein solids are settled out of polluted influent before the influent is conveyed to said one or more primary treatment tanks.

5. The system of claim 1, where in the liquid distribution manifold is connected to the one of more venturis by one or more pipes.

6. The system of claim 1, wherein the one of more secondary treatment tanks comprise at least one of a plug flow reactor, mixed flow reactor, continuously-stirred reactor, or a combination of any of these.

7. The system of claim 1, wherein the one or more primary treatment tanks, one or more secondary treatment tanks, and one or more sedimentation tanks are operably connected in series, in parallel, or in a combination of series and parallel.

8. The system of claim 1, wherein the one or more secondary supernatant pumps are adapted to pump potable water.

9. A process for treating wastewater, comprising:
   a) conveying polluted influent to a primary treatment tank where solids are settled out of the polluted influent to create primary-treated wastewater;
   b) conveying the primary-treated wastewater to a flow equalization channel connected to a secondary treatment tank where aerobic micro-organisms digest organic materials in the primary-treated wastewater to create secondary-treated wastewater, wherein said secondary treatment tank comprises: (i) one or more liquid manifolds connected to one or more venturis suspended within the secondary treatment tank and (ii) an air distribution manifold connected to the one or more venturis suspended within the secondary treatment tank;
   c) conveying the secondary-treated wastewater from the secondary treatment tank through a collection channel to a sedimentation tank where solids are settled out of the secondary-treated wastewater to create secondary supernatant and activated sludge;
   d) conveying a portion of the activated sludge from the sedimentation tank through a return activated sludge pipeline to the flow equalization channel using a return activated sludge pump;
   e) conveying a portion of the secondary supernatant from the sedimentation tank through a secondary supernatant discharge line to the one or more liquid manifolds and on to the one or more venturis using a secondary supernatant pump;
   f) pumping air from one or more air compressors through the one or more air distribution manifolds to the one or more venturis;
   g) mixing the secondary supernatant with air in the one or more venturis to create an air/supernatant mixture;
   h) expelling the air/supernatant mixture from the one or more venturis into the secondary treatment tank to aerate wastewater undergoing treatment.

10. The process of claim 9, wherein the step of aerating the wastewater undergoing treatment further includes using one or more mechanical aerators.

11. The process of claim 9, wherein the air distribution manifold is connected to the one or more venturis by one or more air pipes.

12. The process of claim 9, further comprising the step of conveying polluted influent to one or more pre-treatment tanks wherein solids are settled out of polluted influent before said influent is conveyed to said one or more primary treatment tanks.

13. An activated sludge treatment system for treating wastewater, comprising:
   a) one or more primary treatment tanks adapted to settle solids out of polluted influent;
   b) at least one flow equalization channel fluidically connecting the one or more primary treatment tanks to one or more secondary treatment tanks that are adapted to digest organic materials in primary-treated wastewater with aerobic micro-organisms;
   c) the one or more secondary treatment tanks comprising:
      (i) a liquid distribution manifold connected to one or more venturis suspended within the one or more secondary treatment tanks, wherein said one or more venturis are adapted to discharge an air/liquid mixture into said one or more secondary treatment tanks, and
      (ii) an air distribution manifold connected to the one or more venturis suspended within the one or more secondary treatment tanks;

d) at least one collection channel connected to the one or more secondary treatment tanks and adapted to deliver secondary-treated wastewater to one or more sedimentation tanks;
e) wherein the one or more sedimentation tanks are connected directly or indirectly to one or more return activated sludge pipelines;
f) the one or more return activated sludge pipelines being adapted to carry return activated sludge to the one or more secondary treatment tanks;
g) one or more return activated sludge pumps adapted to pump return activated sludge through the one or more return activated sludge pipelines;
h) one or more secondary mixed liquor pumps adapted to pump mixed liquor from the one or more secondary treatment tanks through one or more mixed liquor lines to the liquid distribution manifold; and
j) one or more air compressors adapted to pump air to the air distribution manifold.

\* \* \* \* \*